United States Patent [19]

Mirow

[11] Patent Number: 4,709,322
[45] Date of Patent: Nov. 24, 1987

[54] HIGH EFFICIENCY TRANSFORMERLESS AC/DC CONVERTER

[76] Inventor: Fred Mirow, 47 Edgewood Rd., Westwood, Mass. 02090

[21] Appl. No.: 759,147

[22] Filed: Jul. 26, 1985

[51] Int. Cl.[4] .............................................. H02M 7/04
[52] U.S. Cl. ......................................... 363/86; 363/89; 363/127; 363/128; 323/285; 323/300
[58] Field of Search ............... 323/283, 285, 300, 351, 323/901; 363/86, 89, 127, 128, 49

[56] References Cited

U.S. PATENT DOCUMENTS

| | | | |
|---|---|---|---|
| 3,353,082 | 11/1967 | Mellott et al. | 363/86 |
| 3,478,258 | 11/1969 | Nagai | 363/62 |
| 4,127,895 | 11/1978 | Krueger | 363/89 |
| 4,347,561 | 8/1982 | McLellan | 363/127 |
| 4,490,779 | 12/1984 | Minks | 363/128 |

Primary Examiner—Peter S. Wong
Assistant Examiner—Jeffrey Sterrett

[57] ABSTRACT

An electronic power supply that converts alternating current to a regulated DC voltage with high efficiency is accomplished by a switch that connects the input AC power source directly to the DC output filter capacitor. This occurs when the input voltage equals the output voltage, and the output voltage is less than the set value.

This power supply can be used with low impedance AC power sources capable of providing high surge currents such as commercial utility lines.

9 Claims, 4 Drawing Figures

HIGH EFFICIENCY TRANSFORMERLESS AC/DC CONVERTER

BACKGROUND OF THE INVENTION

In some applications, such as control and drive circuits for switching regulators, a source of low DC voltage is needed in which the DC voltage is not required to be isolated from the AC power line. In the past the low DC voltage was obtained by dropping a large percentage of the line voltage across a device such as a resistor after the AC input was converted to filtered DC. This approach was very inefficient. Another common approach was to use a transformer to drop the level of the AC voltage before converting to filtered DC. This approach was expensive because of the cost of the transformer.

Additionally, previous inventions have used transistors that conducted current nearly continuously even with large voltage drops across them. Another approach used an SCR which was controlled by an integrating circuit. The charging time of the integrator was controlled by the DC output voltage. While this approach was efficient, it had other problems. During power turn on when the output voltage was low the SCR fired before the AC input could reach peak value. This lead to a high current surge and high DC output voltage unless additional protection was provided.

SUMMARY OF THE INVENTION

The present invention overcomes a problem of low efficiency and large turn on current surges by using a switching device which only conducts when the input voltage is slightly higher than the DC output voltage. Even with high values of current, power loss is low since voltage cannot exceed a set level since the switch is also prevented from turning on at this point.

DETAILED DESCRIPTION OF THE INVENTION

Figure 1A:
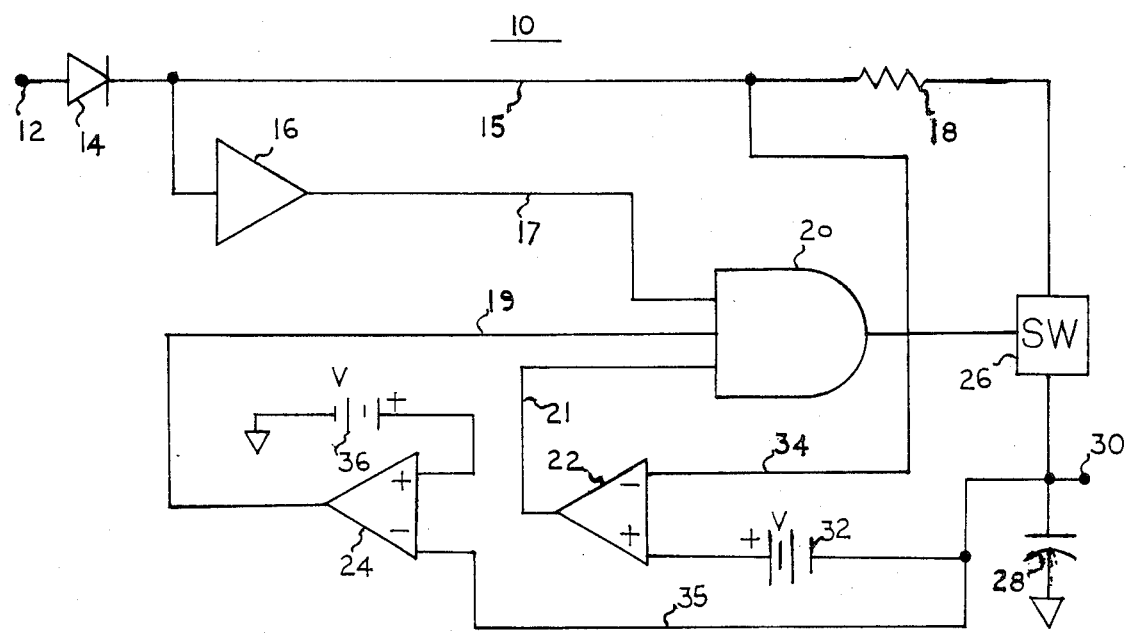
FIG. 1A is a schematic of an AC to DC converter according to the invention.
Figure 1B:
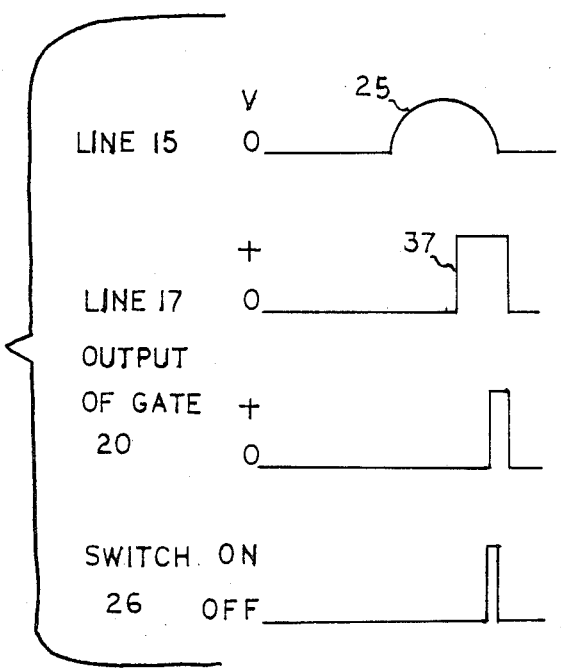
FIG. 1B shows various waveforms at various nodes of FIG. 1.

Referring now to FIGS. 1A, B, there is shown AC to DC converter 10 of the present invention. Input 12 of converter 10 receives a conventional AC input voltage, for example 60 Hertz 120 volt AC line voltage. The input AC voltage received by input 12 is applied to rectifier 14 which produces rectified or pulsating DC 25 at line 15. Rectifier 14 is shown as a single rectifier but may also be a combination of two or more rectifiers. Pulsating DC 25 from diode 14 is applied by line 15 without any filtering to load capacitor 28 through resistor 18 and switch 26 when switch 26 is on. Resistor 18 limits the maximum current flow through switch 26. This current flow is relatively low (may be 0.5 A) since the maximum voltage across resistor 18 is only a few volts (may be 3 V). Switch 26 is controlled by the output of AND gate 20. Switch 26 turns off when the output of AND gate 20 is low or voltage on line 15 is less than voltage at output terminal 30. Converter 10 provides a DC output voltage across capacitor 28 at output terminal 30.

The output of AND gate 20 depends on the state of gate 20 input lines 17, 19, and 21. When input lines 17, 19, and 21 are all high, the output of AND gate 20 goes high turning switch 26 on.

The level on line 21 is controlled by comparator 22. Comparator 22 causes line 21 to go high when the voltage across resistor 18 and switch 26, as applied to comparator 22 by line 34, is less than the reference voltage across reference voltage source 32 (may be 3 V). The transition to the high state of the output of comparator 22 only when voltage across resistor 18 and switch 26 is lower than the voltage of reference voltage source 32 limits power dissipation in resistor 18 and switch 26.

The level on line 19 is controlled by comparator 24. Output line 19 of comparator 24 is high when the output voltage of converter 10 at output terminal 30, as applied to comparator 24 by line 35, is less than the voltage across reference voltage source 36. Reference voltage 36 therefore determines the DC output voltage level at output terminal 30.

The level of line 17 is controlled by decreasing magnitude detector 16. The output of decreasing magnitude detector 16, reducing slope signal 37, is high only after the maximum value of pulsating DC 25 on line 15 is reached. There is a zero level on line 17 at all other times. This zero level on line 17 prevents AND gate 20 from triggering switch 26 during the rising portion of the pulsating DC voltage on line 15. This is required to prevent the output voltage at output 30 from increasing to nearly the peak voltage of pulsating DC 25 voltage when AND gate 20 cannot turn off switch 26. Switch 26 will only turn off when the DC voltage drops to nearly the same level as the output voltage at terminal 30.

Thus switch 26 is turned on only if the voltage across switch 26 and resistor 18 is less than reference voltage source 32 and the output voltage at output terminal 30 is less than reference voltage 36 and pulsating DC voltage 25 on line 15 has a reducing slope.

Figure 2:
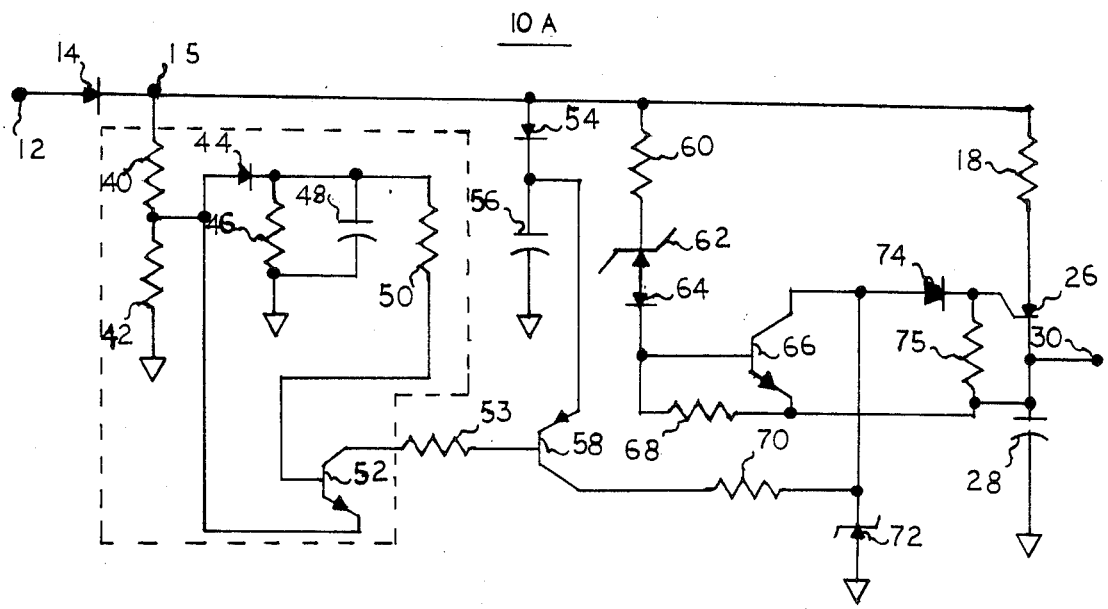
FIG. 2 is a detailed embodiment of FIG. 1.

Referring now to FIG. 2, an alternate embodiment of AC to DC converter 10 is shown. Converter 10a uses SCR 26 as a switch. Pulsating DC 25 on line 15 is supplied to resistors 40, 42 which form a voltage divider reducing the voltage on the base emitter junction of transistor 52. As the voltage level of pulsating DC 25 increases, transistor 52 is off because the base voltage is less than the emitter voltage by the voltage drop across diode 44. After pulsating DC 25 reaches its peak value and starts to decrease, diode 44 blocks current. Capacitor 48 slowly discharges through resistor 46 allowing the voltage at the base of transistor 52 to decrease less rapidly than the voltage at the emitter. When this happens, transistor 52 turns on. Resistor 50 limits the base current of transistor 52.

Transistor 52 is off during the rising slope of pulsating DC 25 because its base voltage is less than its emitter voltage by the voltage drop across diode 44. Only during the reducing slope of pulsating DC 25 can transistor 52 turn on. Thus the elements within dotted block 16 function as a reducing magnitude detector.

Diode 54 charges capacitor 56 to provide power for transistor 58. During the negative slope of pulsating DC 25 when transistor 52 turns on, transistor 58 turns on because its base is coupled to the collector of transistor 52 through current limiting resistor 53. When transistor 58 turn on, the voltage across capacitor 56, which is the peak voltage of pulsating DC 25, is applied through resistor 70 to the cathode of Zener diode 72 and through diode 74 to SCR 26. SCR 26 may now turn on if transistor 66 is off and the breakdown voltage of Zener diode 72 is higher than the output voltage at output terminal 30 plus the drops across diode 74 and the gate of SCR 26. Thus the configuration of converter 10a inherently includes the AND function in which pulsating DC 25 must be in its reducing slope, the output voltage at node 30 must be lower than the reference voltage of Zener diode 72 (ignoring junction voltage drops) and transistor 66 is off.

Transistor 66 is on when the level of pulsating DC 25 on line 15 exceeds the voltage at output node 30 by a predetermined amount. The predetermined amount is selected by the choice of Zener diode 62 (may be 3 V). Diode 64 prevents reverse current through the base of transistor 66 and resistor 60 limits the forward current. Resistor 68 aids in turning transistor 66 off and in keeping transistor 66 off.

When transistor 66 is on, the voltage at the gate of SCR 26 and the voltage at output terminal 30 are substantially equal, thereby preventing the gate of SCR 26 from being forward biased and preventing SCR 26 from turning on.

Zener diode 72 limits the maximum voltage applied to the gate of SCR 26 thereby preventing SCR 26 from being turned on. Zener diode 72 prevents SCR 26 from turning on when the output at output terminal 30 plus the voltage drop across diode 74 and the gates of SCR exceeds the Zener breakdown voltage of Zener diode 72.

Diode 74 prevents reverse current through the gate of SCR 26. Resistor 18 limits the maximum current flow through SCR 26 to output terminal 30. Resistor 75 aids in turning SCR 26 off and increases the breakdown voltage of SCR 26. Capacitor 28 maintains the voltage at output terminal 30 constant when SCR 26 is off.

Figure 3:
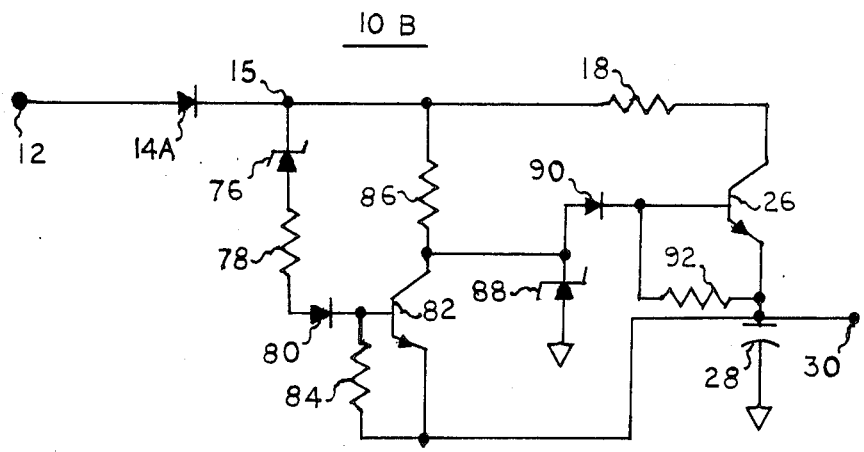
FIG. 3 is another detailed embodiment of FIG. 1.

Referring now to FIG. 3, there is shown another alternate embodiment of converter 10. Converter 10b uses transistor 26 as a switch and may have a full wave rectifier bridge 14a to provide pulsating DC 25 on line 15. Diode 80 prevents the base of transistor 82 from conducting in the reverse direction and diode 90 prevents the base of transistor switch 26 from conducting in the reverse direction. Resistor 84 speeds up the turn-off time of transistor 82 and resistor 92 speeds up the turn-off time of transistor switch 26.

When Zener diode 76 turns on, current is applied to the base of transistor 82 turning transistor 82 on. When the voltage level on line 15 exceeds the voltage level at output terminal 30 by the breakdown voltage of Zener diode 76 plus small voltage drops across diode 80, resistor 78 and the junction of transistor 82, transistor 82 is turned on. When transistor 82 is turned on, the voltage across the base emitter junctions of transistor 26 is low turning transistor 26 off.

When transistor 82 is off, Zener diode 88 determines the maximum voltage level at output terminal 30. Zener diode 88 controls transistor switch 26 in this manner because the base voltage of transistor switch 26 must be higher than the emitter voltage of transistor switch 26 and Zener diode 88 limits the maximum base voltage.

Resistor 86 provides the base current to turn transistor switch 26 on. Resistor 78 limits the maximum base current of transistor 82 and resistor 18 limits the maximum current through transistor switch 26. Resistor 18 may be the bulk resistance of transistor switch 26. Capacitor 28 keeps the output voltage at terminal 30 constant when transistor switch 26 is turned off.

It is claimed:

1. A high efficiency converter for obtaining a lower magnitude DC voltage from an AC voltage without magnetics comprising:
   rectifier means for receiving the AC voltage and providing pulsating DC voltage,
   switch means for applying the pulsating DC to an output terminal when said switch means is closed,
   means for comparing the level of the pulsating DC voltage with the voltage level at the output terminal,
   means for closing the switch means only when the voltage level of the pulsating DC voltage is substantially equal to the voltage at the output terminal.

2. The converter of claim 1 in which the means for closing the switch means includes comparator means directly coupled to the output terminal for determining whether the voltage at the output terminal is less than a reference voltage.

3. The converter of claim 2 in which the comparator includes means for closing the switch in response to the determination.

4. The converter of claim 1 including means for determining whether the voltage across the switch is less than a predetermined amount and closing the switch in response to the determination.

5. The converter of claim 1 in which the switch means comprises an SCR.

6. The converter of claim 5 in which there is further provided a reducing magnitude detector for detecting the reducing slope of the pulsating DC voltage and providing a reducing slope signal in response to the detection.

7. The converter of claim 6 in which the means for closing the switch closes the switch in response to the reducing slope signal.

8. The converter of claim 1 in which the pulsating DC signal is substantially unfiltered.

9. The converter of claim 1 in which there is further provided a substantially low value impedance path between the input and the output when the switch means is closed.

* * * * *